United States Patent [19]
Thore

[11] Patent Number: 6,016,461
[45] Date of Patent: Jan. 18, 2000

[54] METHOD FOR PRODUCING MAPS OF THE RISK IN POSITIONING A WELL IN AN ENVIRONMENT

[75] Inventor: Pierre Thore, Pau, France

[73] Assignee: ElF Exploration Production, Curbevoie, France

[21] Appl. No.: 09/082,907

[22] Filed: May 22, 1998

[30] Foreign Application Priority Data

May 23, 1997 [FR] France .................................. 97 06313

[51] Int. Cl.$^7$ .................................................. G01V 1/28
[52] U.S. Cl. ................................................. 702/6; 702/18
[58] Field of Search ................................ 702/6, 7, 8, 18, 702/10

[56] References Cited

U.S. PATENT DOCUMENTS 5,513,150  4/1996  Sicking et al. .

FOREIGN PATENT DOCUMENTS 2 729 766  7/1996  France .

OTHER PUBLICATIONS

David M. Whitcombe et al., The Application of 3–D depth migration to the development of an Alaskan offshore oil field; Geophysics, vol. 59, No. 10, Oct. 1994, pp. 1551 to 1560.

Primary Examiner—Donald E. McElheny, Jr.
Attorney, Agent, or Firm—Evenson, Mckeown, Edwards & Lenahan, PLLC

[57] ABSTRACT

The method consists in using a first interpreted horizon ($H_0$) extracted from a seismic block migrated with at least a first value of a velocity (V) known with an uncertainty ($\Delta V$), and is characterized in that it consists in performing the following steps:

a) making a second interpreted horizon ($H_1$) by migration of the first horizon ($H_0$) using a second value ($V+\Delta V$) of the velocity, equal to the first value (V) plus the uncertainty ($\Delta V$);

b) making a third interpreted horizon ($H_2$) by migration of the first horizon ($H_0$) using a third value ($V-\Delta V$) of the velocity, equal to the first value (V) less the uncertainty ($\Delta V$);

c) selecting a positioning point ($X_0$) for the well on the said first horizon ($H_0$) and plotting a vertical (D) which passes through the said point ($X_0$) and intersects the second and third horizons($H_1$ and $H_2$) at migrated points ($X_1$, $X_2$);

d) on the said first interpreted horizon ($H_0$), determining the positions (A, B) corresponding to the said migrated points ($X_1$, $X_2$), the portion of the first interpreted horizon ($H_0$) located between the said positions (A, B) constituting the locus of the potential positions of the well for the said uncertainty ($\Delta V$).

15 Claims, 2 Drawing Sheets

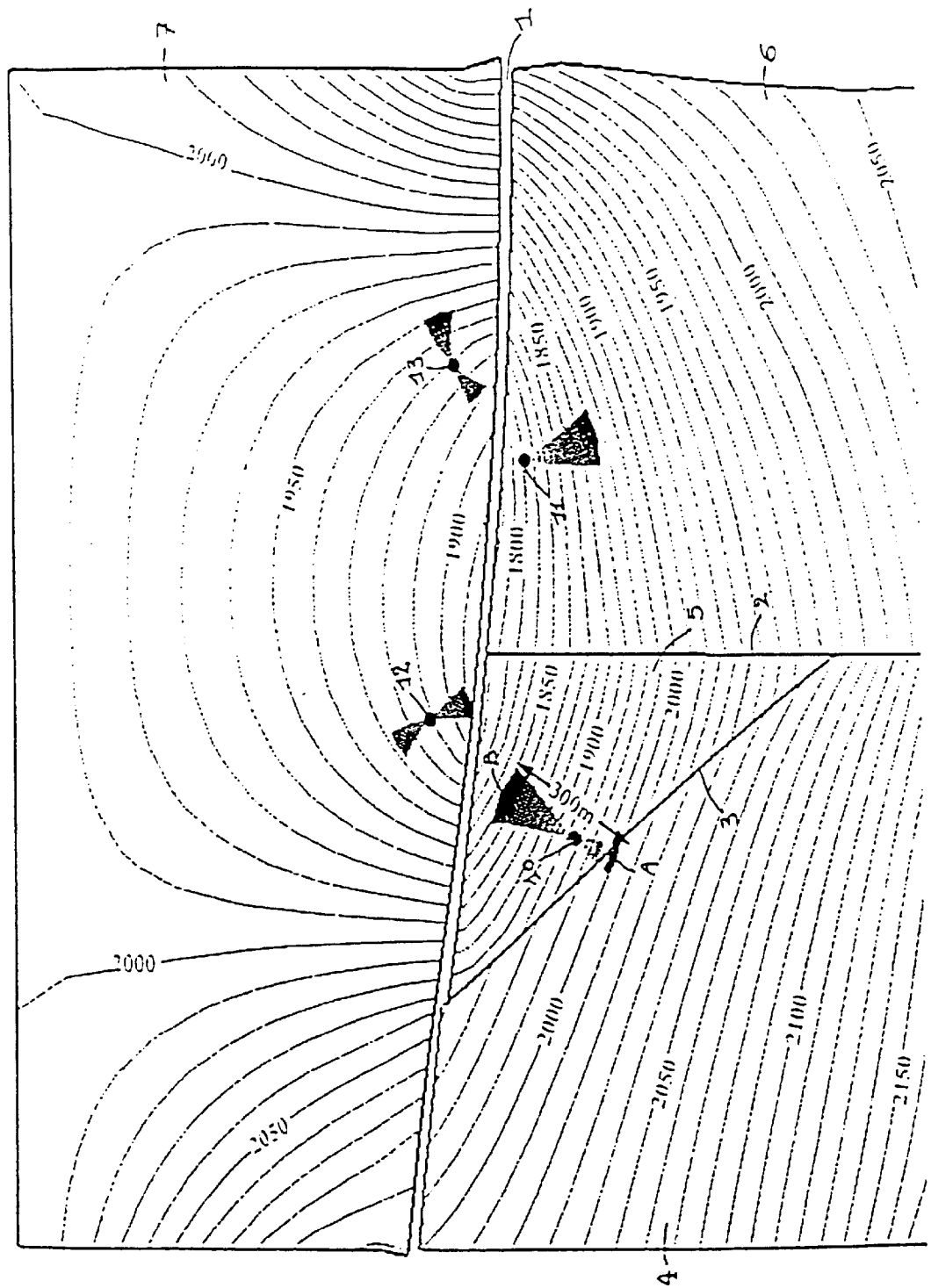
FIG_1

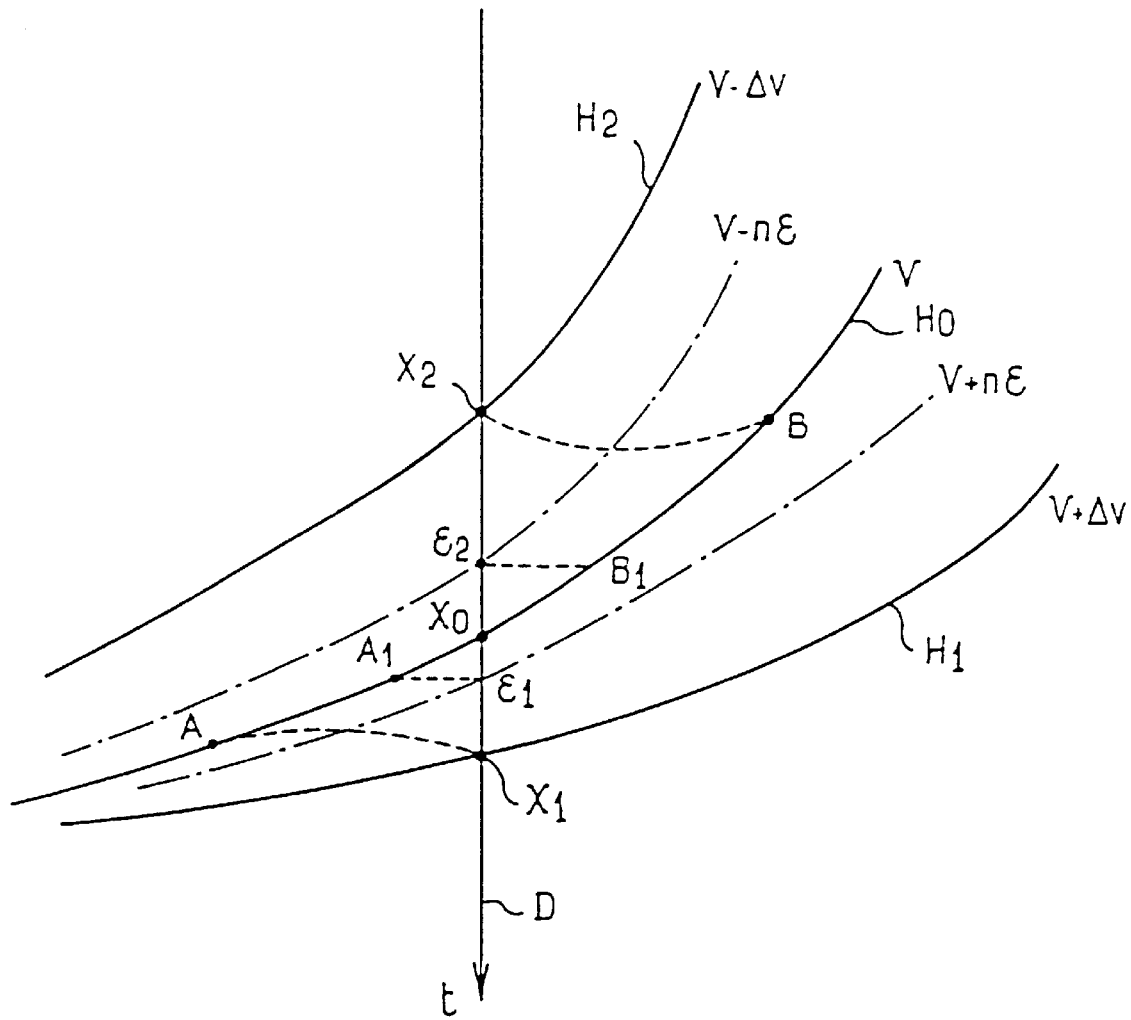
FIG_2

METHOD FOR PRODUCING MAPS OF THE RISK IN POSITIONING A WELL IN AN ENVIRONMENT

The present invention relates to a method for producing maps of the risks in positioning a well in an environment.

In order to ascertain the geometrical structure of the subsurface, it is customary, especially in oil exploration, to make a 3D seismic "iblock" and the corresponding set of stack velocities. The ways in which a 3D or 2D seismic block can be obtained are well-known to those skilled in the art and will not be described in detail. After having obtained a satisfactory seismic block, a migration step is generally carried out. The purpose of the migration operation is to provide the interpreter with an image of the subsurface which is as close as possible to a geological image.

Two main migrations are widely used, namely time migration and depth migration. Time migration provides an acoustic image. Depth migration provides a depth-based image of the subsurface which is as exact as possible. However, the two migration techniques require prior definition of a velocity model. Reference may profitably be made to various proposals for making these velocity models, for example those of LANDA (Geophysical Prospecting No. 86, pages 223 to 243, 1988) or that of WITHCOMBE, 1991, which consists in performing a demigration.

However, it is becoming increasingly necessary to represent the path of at least one wellbore in a spatio-temporal domain, and more particularly to fit the path of a deviated well in a block of migrated seismic data.

The fitting of a well in 2D or 3D seismic is necessary when it is desired to project, onto a 2- or 3-dimensional seismic representation of the environment in which the well has been bored, all the information relating to various data which are recorded locally in or close to the well, these generally being referred to as logs. This is therefore information relating to sonic, density, resistivity, etc. logs, to the depth of the geological strata of the environment, to the biostratigraphic boundaries, to the dips of the reflectors, in particular those defined by the interfaces between two consecutive strata, and to the azimuths or even to the images provided by the various well seismic techniques.

The fitting is therefore carried out, in particular, when the interpreter is starting an interpretation in order to ascertain which seismic horizon corresponds to a given geological marker or reflector, or when the depth representations produced in a time/depth conversion need to be fitted to the well in terms of depth and dip.

The fitting may be carried out either in the depth domain or in the time domain.

Fitting in the depth domain means that there is a desire to obtain a depth model or a series of depth maps (or representations) which are coherent with the depth at the position of the well.

When the fitting is carried out in the time domain, the well path, which is defined in terms of depth, needs to be represented in this time domain. Now, it is in fact this fitting which poses a difficult problem.

It is also possible to perform a calibration in the interval-velocity domain, which is of interest when the desire is to have a velocity model comprising interval velocities which are coherent with the interval velocities estimated for the wells by a calibrated sonic log, or any other method. This is generally the case for the models which are used for migration.

When the desire is to compare a series of attributes or values which are attached to each depth-based point on the path of the well and relate, for example, to the sonic, density or electrical log, to the strata boundaries, to the dips, to the azimuths, etc., it would actually be ideal to represent the seismic image in terms of depth, that is to say make a 3D depth migration and perform the fitting in this "natural" domain. However, this requires accurate knowledge of the velocity field in the environment. In practice, a projection of the path of the well is made in the migrated-time domain (X, Y, T). To do this, it is assumed that the migration has moved the information to its correct position X, Y and that the migrated time is equal to a vertical transit time. The result of this is that the log in the time domain is a vertically stretched version of the depth log, the depth/time relationship being derived in general from integration of the sonic log, calibrated by a check-shot survey or by the first arrival times of a VSP (vertical seismic profile) for example. Unfortunately, the vertical stretching and the repositioning by the time migration in X, Y are approximations which are too broad or coarse when an accurate result is required (for example for the delineation of a reservoir) or in the case of a complex or tectonic environment.

As can be seen, a first essential operation is to produce a depth-based model of propagation velocities.

A number of techniques are used, or have been proposed. Among those which are most commonly used, mention may be made of the one relating to a vertical time/depth conversion, the one using migration along the image ray (the so-called HUBRAL correction), the one using migration along the normal ray, the one using tomography or including inversion of the stack velocities, and the one using the method referred to as "coherence".

Vertical time/depth conversion and migration along the image ray are carried out on the basis of time-migrated reflectors and information regarding the propagation velocities of the seismic waves, extracted either from the well itself (check-shot survey, VSP, etc.) or surface seismic data (stack velocities which have undergone inversion, for example, by application of the DIX formula).

Migration along the normal ray uses reflectors in the stack domain, the said reflectors being obtained either by picking in the stack domain or by demigration of the time-migrated reflectors. This migration uses the same type of information regarding the propagation velocities of the waves as the one mentioned above.

However, all these methods for making a depth representational map have a number of drawbacks.

In most cases, the seismic image of a horizon, after a depth migration for example, is not fitted with the positions measured with the well logs. The reasons for this lack of fitting are developed in an article presented at SEG 1992 by Messrs. COGNOT, THORE and HAAS. The contribution by these authors consists, in order to solve the problems which are encountered, in firstly calculating the effect of a change in the velocity model as a function of the local geometry of the horizon. In practice, it is recommendable to use a method for determining the principle direction of the uncertainty relating to the relative velocity error. The various steps involved in implementing the method are described at length in the said article, and will not therefore be dealt with in detail. Thus, by virtue of the formulae suggested by the authors, it is possible to calculate the components of the uncertainty vector, as well as the azimuth and the dip angles, which can be expressed using the normalized normal vector $(N_x, N_y, N_z)$.

In another article, presented at EAEG 1996 (Amsterdam Jun. 3–7 1996), Messrs. THORE and HAAS proposed a simple, practical way of determining the migration errors due to the uncertainty relating to the velocity field, as well as simplified formulae which can be used depending on whether the migration is a depth migration (formula 1) or a time migration (formula 2), these formulae being usable as a first-order approximation to determine the direction and the norm of a structural uncertainty vector in the case of a variable velocity field, and insofar as the assumption is that of applying the DIX formula, that is to say uniform lateral variations, a plane reflector which does not have a pronounced slope. The approximation remains valid for a sloped reflector, but only on condition that the velocity field is not very complex.

However, not all of the prior methods give a direct and obvious way of determining the locus of the potential positions of a well to be bored.

Moreover, when the environment in question is one with complex tectonics, for example when analysis of the said environment shows the presence of several faults which lie in different directions and may enclose a panel between them it is important for the driller to know, with the greatest possible accuracy, or at least with the highest possible probability, the location on the surface of the environment where he should drill, according to the results which he wishes to achieve.

By virtue of the contributions by HUBRAL, as regards the migration of a point with a constant velocity field, and by THORE et al. as regards the principal components of the displacement vector, it has been possible to gain an idea of the directions of the wells to be bored. However, none of the solutions which are advocated makes it possible to determine the positions on a migrated section of the wells to be bored.

The object of the present invention is to provide a simple yet sufficiently accurate method for determining the positions of the well to be bored.

One object of the present invention is a method for producing maps of the risks in positioning a well in an environment, of the type in which use is made of a first interpreted horizon ($H_0$) extracted from a seismic block migrated with at least a first value of a velocity (V) known with an uncertainty ($\Delta V$), which is characterized in that it consists in performing the following steps:

a) making a second interpreted horizon ($H_1$) by migration of the first horizon ($H_0$) using a second value ($V+\Delta V$) of the velocity, equal to the first value (V) plus the uncertainty ($\Delta V$);

b) making a third interpreted horizon ($H_2$) by migration of the first horizon ($H_0$) using a third value ($V-\Delta V$) of the velocity, equal to the first value (V) less the uncertainty ($\Delta V$);

c) selecting a positioning point ($X_0$) for the well on the said first horizon ($H_0$) and plotting a vertical (D) which passes through the said point ($X_0$) and intersects the second and third horizons ($H_1$ and $H_2$) at migrated points ($X_1$, $X_2$);

d) on the said first interpreted horizon ($H_0$), determining the positions (A, B) corresponding to the said migrated points ($X_1$, $X_2$), the portion of the first interpreted horizon ($H_0$) located between the said positions (A, B) constituting the locus of the potential positions of the well for the said uncertainty ($\Delta V$).

According to another characteristic of the invention, it furthermore consists in (e) selecting an increment ($\epsilon$) for the uncertainty relating to the velocity ($\Delta V$);

(f) making as many interpreted and migrated horizons as there are values (n) of increment ($\epsilon$) in the said uncertainty relating to the velocity ($\Delta V$); and (g) performing step d) for each of the n values of the said increment ($\epsilon$).

According to another characteristic of the invention, it furthermore consists in determining the azimuth ($\theta$) of the first horizon ($H_0$) at the point ($X_0$) with its uncertainty ($\Delta\theta$).

According to another characteristic of the invention, for each value ($\theta_k$) of the azimuth at ($X_0$), ($\theta_k$) lying between ($\theta-\Delta\theta$) and ($\theta+\Delta\theta$), a line ($A_k B_k$) of the potential positions of the well ($X_0$) is constructed which passes through ($X_0$) and corresponds to the various migration velocities lying between ($V+\Delta V$) and ($V-\Delta V$).

According to another characteristic of the invention, the lines ($A_k B_k$) are juxtaposed in order to form a surface constituting the locus of the potential positions of the well at the point ($X_0$).

According to another characteristic of the invention, on the basis of the migration velocity (V) and its uncertainty ($\Delta V$), a distribution of the said migration velocity (V) is established and the probability associated with each potential position of the said well is determined.

According to another characteristic of the invention, on the basis of the azimuth ($\theta$) and its uncertainty ($\Delta\theta$), a coupled probability is determined which is a function of the velocity and the azimuth.

According to another characteristic of the invention, the seismic block is a time-migrated block.

According to another characteristic of the invention, the principal component of the displacement vector of the uncertainty is given by the following formulae:

$$\Delta x = -2V^2 \cdot t \cdot \frac{\delta_t}{\delta x} \cdot \frac{\Delta V}{V}$$

$$\Delta y = -2V^2 \cdot t \cdot \frac{\delta_t}{\delta y} \cdot \frac{\Delta V}{V}$$

$$\Delta t_M = -t \cdot \tan^2\Phi \cdot \frac{\Delta V}{V} \text{ with } \tan^2\Phi = \frac{(V \cdot p)^2}{1 - (V \cdot p)^2}$$

in which:

V is the time-migration velocity, $\Delta V$ is the uncertainty relating to the migration velocity, t is the time, $t_M$ is the migrated time, $\Phi$ is the dip angle, p is the ray parameter, and x and y are the spatial coordinates of a point in the block (x, y, t).

According to another characteristic of the invention, the seismic block is a depth-migrated block.

According to another characteristic of the invention, the principal component of the displacement vector of the uncertainty is given by the following formulae:

$$\Delta x = -2z\frac{\delta z}{\delta x}\frac{\Delta V}{V}$$

$$\Delta y = -2z\frac{\delta z}{\delta y}\frac{\Delta V}{V}$$

$$\Delta z = z(1 - \tan^2\Phi)\frac{\Delta V}{V}$$

in which:

V is the depth-migration velocity, $\Delta V$ is the uncertainty relating to the migration velocity, $\Phi$ is the dip angle, and x, y and z are the spatial coordinates of the point in the block with axes(x, y, z).

Other advantages and characteristics will emerge more clearly on reading a preferred embodiment of the invention, as well as from the appended drawings, in which:

FIG. 1 is a plan view of a migrated interpreted horizon $H_0$

FIG. 2 is a section (x, t) of the horizon in FIG. 1, which includes other horizons $H_1$ and $H_2$.

In one illustrative embodiment of the method according to the invention, an interpreted horizon is provided, for example such as the one represented schematically in FIG. 1, the said horizon having been extracted from a time-migrated seismic block. The two-way times, expressed in milliseconds, are indicated on the curves of isovalues I of the horizon.

The horizon shows certain seismic events, specifically three faults 1, 2, 3 as concerns FIG. 1; fault 1 is oriented north/south with a throw to the west; fault 2 is oriented east/west with a lower panel 4 to the south, while fault 3, the smallest one, is oriented north-east/south-west and has substantially no throw. An isolated panel 5 is enclosed between the three faults 1, 2 and 3, the other panels being referenced 6 and 7.

Using known means, for example the ones described in the articles by Messrs. THORE et al., the interpreter also provides the uncertainty $\Delta V$ relating to the velocity field V, the said uncertainty $\Delta V$ being inherent in the technique with which the velocity field is determined and in the tectonics (geological context) of the environment, and furthermore in the well information which is accessible when determining the velocity field.

The interpreter also provides the uncertainty associated with the picking, which is expressed as an uncertainty $\Delta\theta$ relating to the azimuth $\theta$.

In FIG. 2, which is a section (x, t) of the interpreted horizon in FIG. 1, the said horizon has been referenced by $H_0$. The migration velocity V, known with an uncertainty $\Delta V$, lies between the extreme values $V_{min}$ and $V_{max}$ of the velocity field which is used.

In a first step, the first horizon $H_0$ is time-migrated with a migration velocity $V+\Delta V$. This produces a second migrated horizon $H_1$, then the same step is repeated, but this time with a migration velocity $V-\Delta V$, so as to produce a third migrated horizon $H_2$.

A point $X_0$, the potential position of a well, is chosen on the horizon $H_0$ in FIG. 2, then the vertical D passing through the point $X_0$ is dropped. The vertical D intersects the three horizons $H_0$, $H_1$ and $H_2$ respectively at the points $X_0$, $X_1$ and $X_2$.

In another step, the positions A and B corresponding to the migrated intersection points $X_1$ and $X_2$ are determined on the first horizon $H_0$. The correspondence between $X_1$ and A is found by demigrating $X_1$ with a velocity $V+\Delta V$, followed by a migration of the obtained point with the velocity V. Similarly, $X_2$ is demigrated with the velocity $V-\Delta V$, followed by a migration with the velocity V in order to obtain the point B. The locus of the potential positions of the well positioned at $X_0$ consists of the horizon part AB.

One of the ways of performing these demigration/migration steps consists in applying the simplified formulae determined by P. THORE et al. Specifically, the components of the displacement vector $X_1A$ are given by the following simplified formulae:

$$\begin{cases} \Delta x_1 = -2V^2 \cdot t \cdot \frac{\delta t}{\delta x_1} \cdot \frac{\Delta V}{V} \\ \Delta y_1 = -2V^2 \cdot t \cdot \frac{\delta_t}{\delta y_1} \cdot \frac{\Delta V}{V} \\ \Delta t_M = -t \cdot \tan^2\Phi \cdot \frac{\Delta V}{V} \text{ with } \tan^2\Phi = \frac{(V \cdot p)^2}{1-(V \cdot p)^2} \end{cases}$$

in which:

V is the time-migration velocity of the first migrated interpreted horizon $H_0$, $\Delta V$ is the uncertainty relating to the migration velocity V, t is the time, $t_M$ is the migrated time corresponding to the migrated point $X_1$, $\Phi$ is the dip angle, p is the ray parameter, $x_1$ and $y_1$ are the spatial coordinates of the point $X_1$.

The above formulae also make it possible to calculate the components $\Delta x_2$ and $\Delta Y_2$ of the displacement vector $X_2B$.

An example which may be considered is that the position $X_0$ is that of the well 10 indicated in FIG. 1, the migration velocity V being equal to 2000 m/s, the uncertainty $-\Delta V$ being equal to 60 m/s and the is uncertainty $+\Delta V$ being equal to 40 m/s.

The locus of the potential positions of the well 10 on the horizon $H_0$ consists of a segment AB which lies on either side of the position of the point 10 and has a length of about 300 m. It can be seen that, for migration velocities lying between 1940 and 2000 m/s, the well 10 remains located in the isolated panel 5, whereas for migration velocities in excess of 2000 m/s, the well has strong chances of lying in the panel 4. Under these conditions, the person in charge of drilling will make a decision whether or not to bore the well 10 at the position $X_0$.

The risk associated with the choice of a position for setting up a well will now be determined. For this, each potential position on the segment AB is associated with its occurrence probability. To do this, use is made of the type of law provided by the interpreter, Gaussian law, triangular law or uniform law, which corresponds to the distribution of the velocities lying between $V_{min}$ and $V_{max}$. For example, for a triangular law, the deviations relating to the velocity $+\Delta V$ and $-\Delta V$ are provided, it being possible for $+\Delta V$ and $-\Delta V$ to be equal or unequal. The interval $[V-\Delta V, V+\Delta V]$ is then divided into discrete values corresponding to 2n+1 potential positions, the number n being fixed arbitrarily, for example equal to 10 which gives 21 potential positions, all lying on the locus AB. Each point $A_1 \ldots A_j, \ldots A_n, \ldots B_1 \ldots B_j, \ldots B_n$ has a corresponding probability calculated on the basis of the law provided by the interpreter, this law being triangular in the chosen example. The probability of the well lying between $X_0$ and $A_i$ is equal to $$\int_{X_0}^{A_i} P_{vj} ds.$$

With the aid of the probability used, it was found that the well 10 had a 20% chance of being in the panel 4, and that the well 11 had a 35% chance of lying in the main fault 1. The wells 12 and 13 have a 100% chance of lying in the panel 7.

According to a preferred embodiment of the invention, an increment $\epsilon$ for the uncertainty $\Delta V$ in the velocity V is selected, and as many interpreted horizons are made as there are values N of increment in the said uncertainty $\Delta V$. The next step is to determine those migrated points $\epsilon_1 \ldots \epsilon_n$ of the said interpreted horizons with the N values of the increment $\epsilon$ which intersect the vertical, in the same way as the points $X_1$ and $X_2$. The positions $A_1, B_1, \ldots A_n, B_n$ corresponding to the said migrated points $\epsilon_1 \ldots \epsilon_n$ are then determined on the interpreted horizon $H_0$. This allows better refinement of the locus of the potential positions of the point on the interpreted horizon $H_0$.

As for the velocity, the azimuth $\theta_0$ at the point $X_0$ is known with a certain accuracy or uncertainty $\Delta\theta$, the origin of which may be the picking or the various processing phases which have led to the production of the interpreted horizon (Krigging). In order to obtain a surface of the potential positions of the well, it is necessary to couple the uncertainties relating to the velocity and relating to the azimuth at the point $X_0$.

For each value $\theta_k$ of the azimuth at $X_0$, $\theta_k$ lying between $\theta+\Delta\theta$ and $\theta-\Delta\theta$, a line $A_k B_k$ is formed which passes through $X_0$ and corresponds to the various migration velocities lying between $V_{min}$ and $V_{max}$. Juxtaposing the lines $A_k B_k$ forms the surface of the loci of potential positions of the well corresponding to the point $X_0$.

When the interpreter also provides a probability law associated with the uncertainty relating to the azimuth $\theta$, it is then possible, for each point on the surface which is the locus of the potential positions of the well at $X_0$, to calculate a coupled probability, a function of the velocity and the azimuth, for the well to lie between $X_0$ and $A_{ik}$ in the azimuth $\theta_k$.

Instead of a time-migrated seismic block, it is possible to use a depth-migrated seismic block which is obtained directly or on the basis of the time-migrated seismic block, as is known to those skilled in the art, for example by stretching. In a depth-based seismic block, the principal component of the displacement vector relating to the uncertainty is given by the following formulae:

$$\begin{cases} \Delta x = -2z \dfrac{\delta_z}{\delta x} \Delta \dfrac{V}{V} \\ \Delta y = -2z \dfrac{\delta_z}{\delta y} \Delta \dfrac{V}{V} \\ \Delta z = z(1 - \tan^2\Phi)\Delta \dfrac{V}{V} \end{cases}$$

in which:

$\begin{cases} V \text{ is the depth-migration velocity,} \\ \Delta V \text{ is the uncertainty relating to the migration velocity,} \\ \Phi \text{ is the dip angle,} \\ x, y \text{ and } z \text{ are the spatial coordinates of a point in} \\ \text{the seismic block with axes}(x, y, z). \end{cases}$

I claim:

1. A method for producing maps of the risks in positioning a well in an environment, in which use is made of a first interpreted horizon ($H_0$) extracted from a seismic block migrated with at least a first value of a velocity (V) known with an uncertainty ($\Delta V$), which consists in performing the following steps:

a) making a second interpreted horizon ($H_1$) by migration of the first horizon ($H_0$) using a second value (V+$\Delta V$) of the velocity, equal to the first value (V) plus the uncertainty ($\Delta V$);

b) making a third interpreted horizon ($H_2$) by migration of the first horizon ($H_0$) using a third value (V-$\Delta V$) of the velocity, equal to the first value (V) less the uncertainty ($\Delta V$);

c) selecting a positioning point ($X_0$) for the well on the said first horizon ($H_0$) and plotting a vertical (D) which passes through the said point ($X_0$) and intersects the second and third horizons ($H_1$ and $H_2$) at migrated points ($X_1, X_2$);

d) on the said first interpreted horizon ($H_0$), determining the positions (A, B) corresponding to the said migrated points ($X_1, X_2$), the portion of the first interpreted horizon ($H_0$) located between the said positions (A, B) constituting the locus of the potential positions of the well for the said uncertainty ($\Delta V$).

2. The method as claimed in claim 1, which furthermore consists in (e) selecting an increment ($\epsilon$) for the uncertainty relating to the velocity ($\Delta V$);

(f) making as many interpreted and migrated horizons as there are values (n) of increment ($\epsilon$) in the said uncertainty relating to the velocity ($\Delta V$); and (g) performing step d) for each of the n values of the said increment ($\epsilon$).

3. The method as claimed in claim 2, which furthermore consists in determining the azimuth ($\theta$) of the first horizon ($H_0$) at the point ($X_0$) with its uncetainty ($\Delta\theta$).

4. The method as claimed in claim 1, wherein, on the basis of the migration velocity (V) and its uncertainty ($\Delta V$), a distribution of the said migration velocity (V) is established and the probability associated with each potential position of the said well is determined.

5. The method as claimed in claim 4, wherein, on the basis of the azimuth ($\theta$) and its uncertainty ($\Delta\theta$), a coupled probability is determined which is a function of the velocity and the azimuth.

6. The method as claimed in claim 1, wherein the seismic block is a time-migrated block.

7. The method as claimed in claim 6, wherein the principal component of the displacement vector of the uncertainty is given by the following formulae:

$$\Delta x = -2V^2 \cdot t \cdot \dfrac{\delta_t}{\delta x} \cdot \dfrac{\Delta V}{V}$$

$$\Delta y = -2V^2 \cdot t \cdot \dfrac{\delta_t}{\delta y} \cdot \dfrac{\Delta V}{V}$$

$$\Delta t_M = -t \cdot \tan^2\Phi \cdot \dfrac{\Delta V}{V} \text{ with } \tan^2\Phi = \dfrac{(V \cdot p)^2}{1 - (V \cdot p)^2}$$

in which:

V is the time-migration velocity, $\Delta V$ is the uncertainty relating to the migration velocity, t is the time, $t_M$ is the migrated time, $\Phi$ is the dip angle, p is the ray parameter, and x and y are the spatial coordinates of a point in the block (x, y, t).

8. The method as claimed in claim 1, wherein the seismic block is a depth-migrated block.

9. The method as claimed in claim 8, wherein the principal component of the displacement vector of the uncertainty is given by the following formulae:

$$\Delta x = -2z \frac{\delta_z}{\delta x} \frac{\Delta V}{V}$$

$$\Delta y = -2z \frac{\delta_z}{\delta y} \frac{\Delta V}{V}$$

$$\Delta z = z(1 - \tan^2 \Phi) \frac{\Delta V}{V}$$

in which:
V is the depth-migration velocity,
$\Delta V$ is the uncertainty relating to the migration velocity,
$\Phi$ is the dip angle, and
x, y and z are the spatial coordinates of a point in the block with axes (x, y, z).

10. The method as claimed in claim 1, which furthermore consists in determining the azimuth ($\theta$) of the first horizon ($H_0$) at the point ($X_0$) with its uncertainty ($\Delta\theta$).

11. The method as claim 10, wherein, on the basis of the azimuth ($\theta$) and its uncertainty ($\Delta\theta$), a coupled probability is determined which is a function of the velocity and the azimuth.

12. The method as claimed in claim 10, wherein, for each value ($\theta_k$) of the azimuth at ($X_0$), ($\theta_k$) lying between ($\theta-\Delta\theta$) and ($\theta+\Delta\theta$), a line ($A_k B_k$) of the potential positions of the well ($X_0$) is constructed which passes through ($X_0$) and corresponds to the various migration velocities lying between (V+$\Delta$V) and (V-$\Delta$V).

13. The method as claimed in claim 12, wherein, on the basis of the azimuth ($\theta$) and its uncertainty ($\Delta\theta$), a coupled probability is determined which is a function of the velocity and the azimuth.

14. The method as claimed in claim 12, wherein the lines ($A_k B_k$) are juxtaposed in order to form a surface constituting the locus of the potential positions of the well at the point ($X_0$).

15. The method as claimed in claim 14, wherein, on the basis of the azimuth ($\theta$) and its uncertainty ($\Delta\theta$), a coupled probability is determined which is a function of the velocity and the azimuth.

* * * * *